US008541676B1

(12) United States Patent
Waldman

(10) Patent No.: US 8,541,676 B1
(45) Date of Patent: Sep. 24, 2013

(54) METHOD FOR EXTRACTING INDIVIDUAL INSTRUMENTAL PARTS FROM AN AUDIO RECORDING AND OPTIONALLY OUTPUTTING SHEET MUSIC

(76) Inventor: Alexander Waldman, Boca Raton, FL (US)

( * ) Notice: Subject to any disclaimer, the term of this patent is extended or adjusted under 35 U.S.C. 154(b) by 266 days.

(21) Appl. No.: 13/042,172

(22) Filed: Mar. 7, 2011

Related U.S. Application Data

(60) Provisional application No. 61/311,314, filed on Mar. 6, 2010.

(51) Int. Cl.
*G01H 7/00* (2006.01)

(52) U.S. Cl.
USPC .......................................................... 84/603

(58) Field of Classification Search
USPC .......................................................... 84/603
See application file for complete search history.

(56) References Cited

U.S. PATENT DOCUMENTS 7,386,357 B2 * 6/2008 Zhang ............................ 700/94
2005/0283361 A1 * 12/2005 Yoshii et al. .................. 704/219

FOREIGN PATENT DOCUMENTS

JP 2001067068 A * 3/2001

* cited by examiner

*Primary Examiner* — Jianchun Qin
(74) *Attorney, Agent, or Firm* — Daniel S. Polley, P.A.

(57) ABSTRACT

A method and computer based program which performs a series of steps for automatically and accurately determining each note played in a song for each instrument and vocal. The method and program can transcribe or create sheet music for each individual instrument, as well as provide the ability to remove any combination of or individual instruments or vocal track basically from nearly any existing song, or future songs.

12 Claims, 3 Drawing Sheets

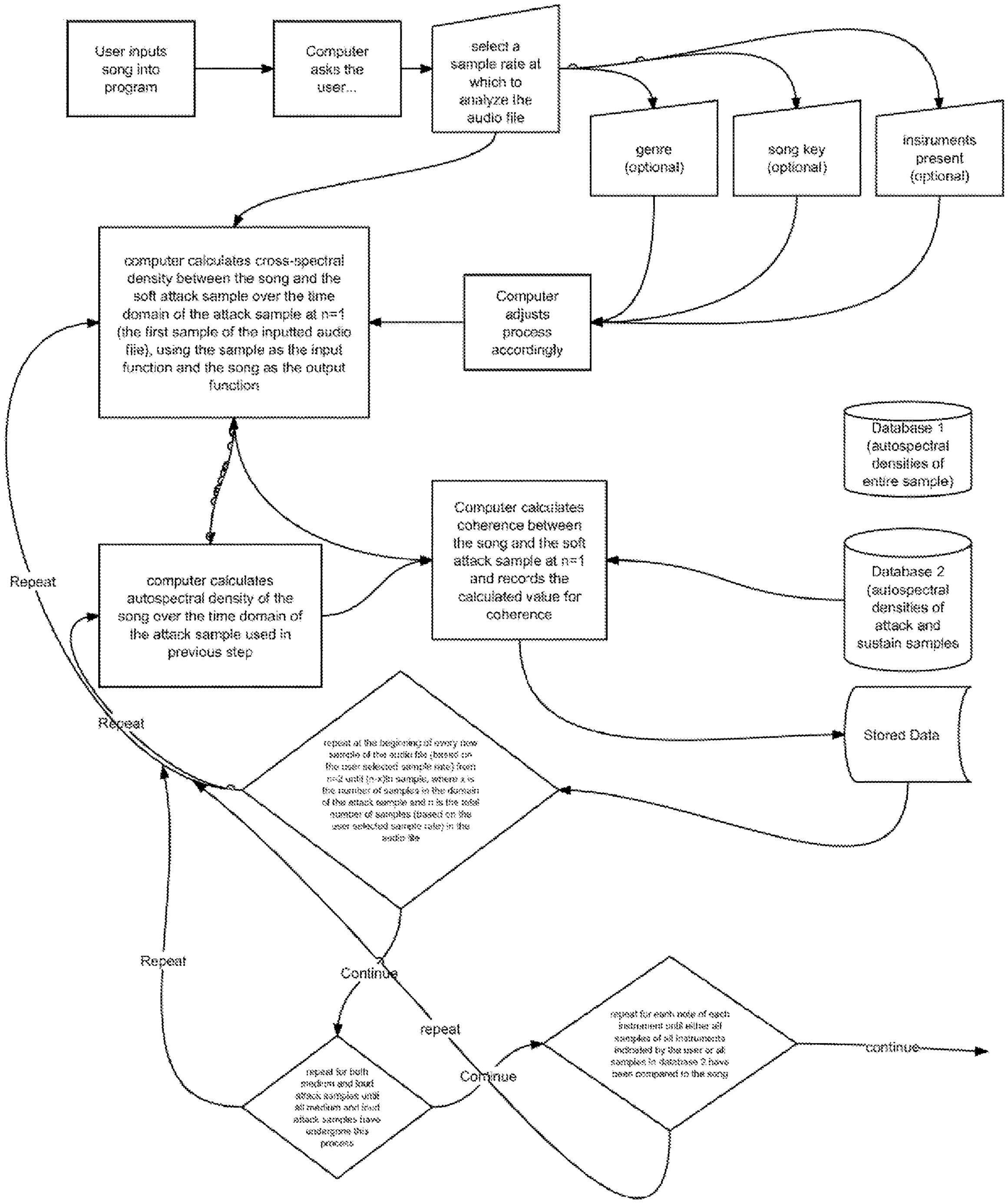
User inputs song into program
Computer asks the user...
select a sample rate at which to analyze the audio file
genre (optional)
song key (optional)
instruments present (optional)
Computer adjusts process accordingly
computer calculates cross-spectral density between the song and the soft attack sample over the time domain of the attack sample at n=1 (the first sample of the inputted audio file), using the sample as the input function and the song as the output function
Database 1 (autospectral densities of entire sample)
Computer calculates coherence between the song and the soft attack sample at n=1 and records the calculated value for coherence
Database 2 (autospectral densities of attack and sustain samples
computer calculates autospectral density of the song over the time domain of the attack sample used in previous step
Repeat
Repeat
Stored Data
repeat at the beginning of every new sample of the audio file (based on the user selected sample rate) from n=2 until (n-x)th sample, where x is the number of samples in the domain of the attack sample and n is the total number of samples (based on the user selected sample rate) in the audio file
Repeat
Continue
repeat
Continue
repeat for both medium and loud attack samples until all medium and loud attack samples have undergone this process
repeat for each note of each instrument until either all samples of all instruments indicated by the user or all samples in database 2 have been compared to the song
continue

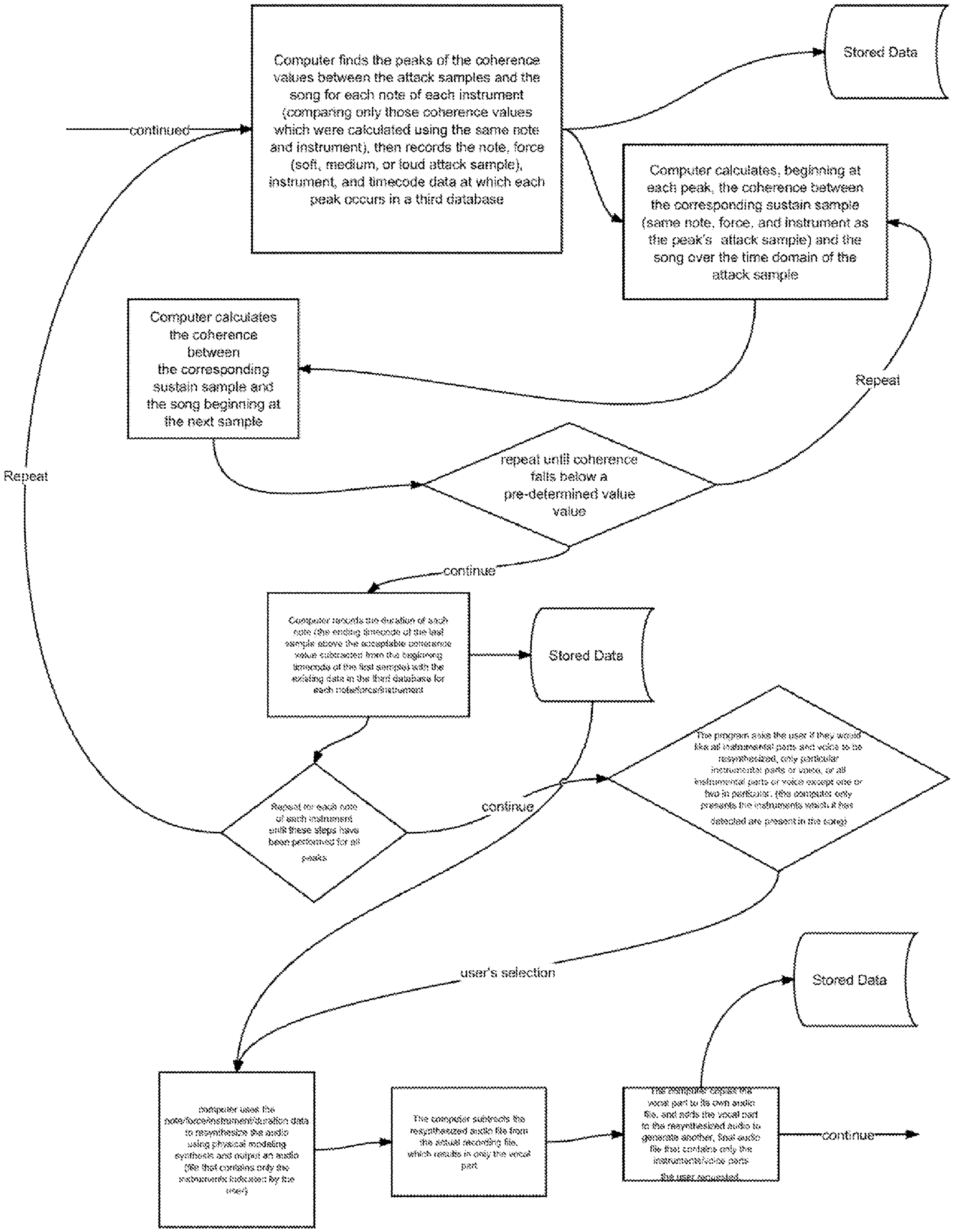
continued
Computer finds the peaks of the coherence values between the attack samples and the song for each note of each instrument (comparing only those coherence values which were calculated using the same note and instrument), then records the note, force (soft, medium, or loud attack sample), instrument, and timecode data at which each peak occurs in a third database
Stored Data
Computer calculates, beginning at each peak, the coherence between the corresponding sustain sample (same note, force, and instrument as the peak's attack sample) and the song over the time domain of the attack sample
Computer calculates the coherence between the corresponding sustain sample and the song beginning at the next sample
Repeat
repeat until coherence falls below a pre-determined value value
Repeat
continue
Computer records the duration of each note (the ending timecode of the last sample above the acceptable coherence value subtracted from the beginning timecode of the first sample) with the existing data in the third database for each note/force/instrument
Stored Data
Repeat for each note of each instrument until these steps have been performed for all peaks
continue
The program asks the user if they would like all instrumental parts and voice to be resynthesized, only particular instrumental parts or voice, or all instrumental parts or voice except one or two in particular. (the computer only presents the instruments which it has detected are present in the song)
user's selection
Stored Data
computer uses the note/force/instrument/duration data to resynthesize the audio using physical modeling synthesis and output an audio file that contains only the instruments indicated by the user)
The computer subtracts the resynthesized audio file from the actual recording file, which results in only the vocal part
The computer copies the vocal part to its own audio file, and adds the vocal part to the resynthesized audio to generate another, final audio file that contains only the instruments/voice parts the user requested
continue

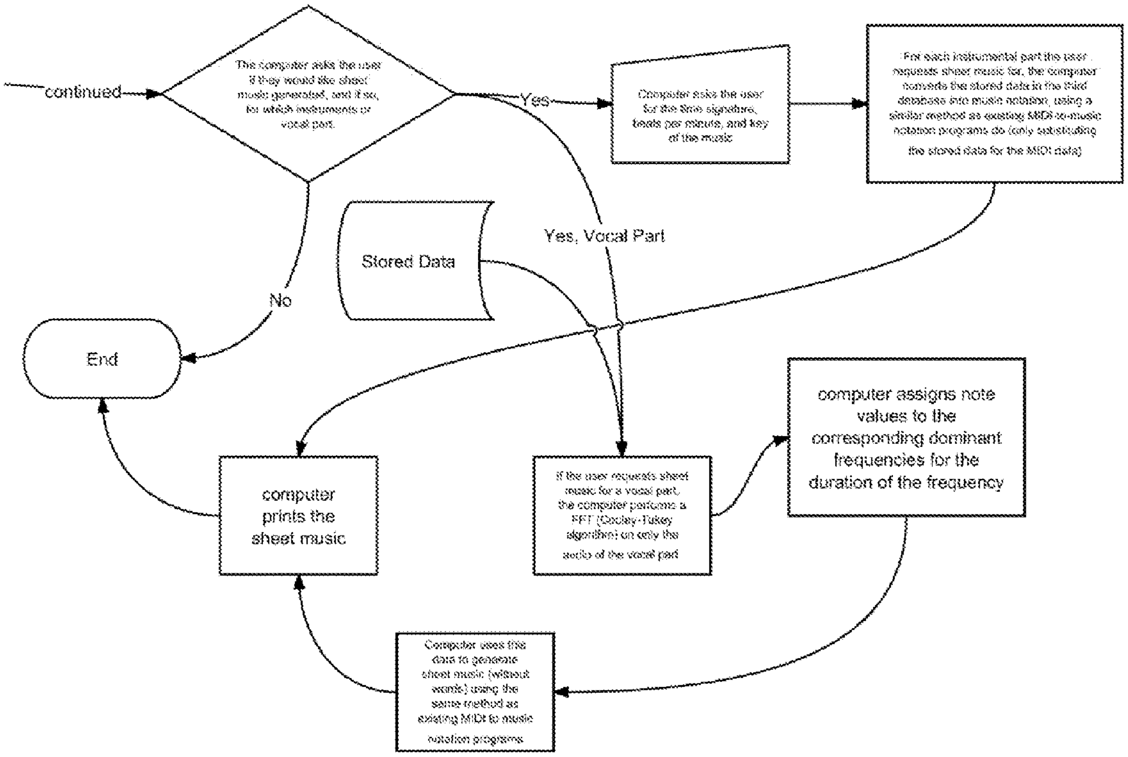
continued
The computer asks the user if they would like sheet music generated, and if so, for which instruments or vocal part.
Yes
Computer asks the user for the time signature, beats per minute, and key of the music
For each instrumental part the user requests sheet music for, the computer converts the stored data in the third database into music notation, using a similar method as existing MIDI-to-music notation programs do (only substituting the stored data for the MIDI data)
No
Stored Data
Yes, Vocal Part
End
computer prints the sheet music
If the user requests sheet music for a vocal part, the computer performs a FFT (Cooley-Tukey algorithm) on only the audio of the vocal part
computer assigns note values to the corresponding dominant frequencies for the duration of the frequency
Computer uses this data to generate sheet music (without words) using the same method as existing MIDI to music notation programs

METHOD FOR EXTRACTING INDIVIDUAL INSTRUMENTAL PARTS FROM AN AUDIO RECORDING AND OPTIONALLY OUTPUTTING SHEET MUSIC

This application claims the benefit of and priority to U.S. Provisional Patent Application Ser. No. 61/311,314, filed Mar. 6, 2010, which application is incorporated by reference in its entirety.

1. FIELD OF THE INVENTION

The present invention generally relates to audio recordings and in more particularly to extracting, identifying and/or isolating individual instrumental parts and creating sheet music from an audio recording.

2. BACKGROUND OF THE INVENTION

Currently, there are few options available for transcribing sheet music from recorded audio, and for removing specific instruments from recorded audio while preserving the rest. To transcribe the music, one must listen repeatedly to an audio file and make an educated guess as to the notes played. The transcriber then writes those notes in proper music notation on a staff, typically with no confirmation that these notes are actually in the music. Additionally, any existing methods for separating instruments (or vocal tracks) in a single-track recording are often expensive, time consuming, inefficient, and do not guarantee results. It is to the effective resolution of the above shortcomings that the present invention is directed to.

SUMMARY OF THE INVENTION

The present invention generally relates to a software and computer based method that is able to automatically transcribe sheet music for each instrumental part of a digital audio music file. The present invention method can also manipulate the digital audio music file by removing any individual instrumental part or all vocal parts, while leaving the rest of the original recording intact. The present invention method has applications in both the professional and amateur music recording industries, as it can afford the same flexibility as multi-track recording to recordings made on a single audio track, thus, allowing for errors in any particular instrumental part to be erased from an otherwise good recording. Additionally, the present invention method allows for easy transcription of sheet music, and accordingly has applications for all musicians. The software based method can function by calculating the spectral coherence between pre-recorded sampled notes and the audio file. Using the sampled notes as the input signal and the audio file as the output signal, at (predetermined intervals) the method can identify instruments and notes in the song. The method can record the notes and instruments it detects (with reference to a timecode). The length of time each note can be sounded and the method can re-synthesize the original audio (without the vocal part) using the data previously recorded and physical modeling synthesis. Sheet music can also be generated from the recorded data using some user inputs (time signature, beats per minute, and key) and fundamental music theory.

Thus, the present invention provides a software and computer based method which can perform a series of steps for automatically and accurately determining each note played in a song for each instrument and vocal. The method and software program can transcribe or create sheet music for each individual instrument, as well as provide the ability to remove any combination of or individual instruments or vocal track basically from nearly any existing song, or future songs. The present invention provides for a unique and novel software based method that allows that incorporates complex signal processing and Fourier analysis, and minimal user input, in order to achieve its functions of automatically and accurately determine each note played in a song, transcribing sheet music for individual instruments, and/or removing any combination of or individual instruments or vocal tracks from almost any song.

BRIEF DESCRIPTION OF THE DRAWING

The drawing is a three page flowchart of the preferred embodiment method in accordance with the present invention.

DETAILED DESCRIPTION OF THE PREFERRED EMBODIMENT

Referring to the flowchart for reference, the various steps for the present invention software based method will described. Generally, the present invention performs a series of steps for automatically and accurately determining each note played in a song for each instrument and vocal, which can be used to transcribe or create sheet music for each individual instrument, as well as providing the ability to remove any combination of or individual instruments or vocal track basically from nearly any existing song, or future songs.

Below the various general steps performed by the preferred embodiment of the present invention method and program are discussed:

1. An electronic database is created by:
   a. Recording and storing about 600 samples, preferably digital, of each note on each instrument desired (which can be all instruments, one instrument, a select group of instruments, etc.) or any other number of sufficient samples; and where about 600 samples are selected (which will be used for example purposes only in describing below the present invention method) about 200 samples are played with minimal force, about 200 samples are played with average force, and about 200 samples are played forcefully;
   b. Averaging the about 200 minimal force samples with each other, averaging the about 200 average force samples with each other, and averaging the about 200 forceful samples with each other, and storing all of these samples and their averages in the electronic database;
   c. Calculating the autospectral density for each of the about 600 samples per note per instrument; and
   d. Averaging the about 200 autospectral densities calculated in above step 1C for each force per note per instrument, which preferably results in 3 autospectral densities per note per instrument (one soft, one average, and one loud). Preferably, all of the resulting autospectral densities can be stored in the electronic database
2. The electronic database can be arranged such that that each note is arranged together and grouped by instrument
3. A second electronic database can also be created by:
   a. Splitting the samples from step 1 into two parts: the attack (very beginning of the sample), and the sustain (the rest of the sample);

b. Averaging the about 200 minimal force attack samples with each other, averaging the about 200 average force attack samples with each other, and averaging the about 200 forceful attack samples with each other, and preferably storing all of these samples in the second electronic database;

c. Averaging the about 200 minimal force sustain samples with each other, averaging the about 200 average force sustain samples with each other, and averaging the about 200 forceful sustain samples with each other, and preferably storing all of these samples in the second electronic database; and d. Performing steps 1C and 1D for each of the attack samples and each of the sustain samples, resulting in 6 additional autospectral densities per note per instrument and preferably storing all of these resulting autospectral densities in the second electronic database 4. The second database can be arranged identically to the first.

5. Thus, in the preferred embodiment, there can be 9 autospectral densities per note per instrument. (3 complete, 3 attack, and 3 sustain)

a. In the preferred embodiment, each note can have one autospectral density for:

i. Soft complete sample
ii. Average complete sample
iii. Forceful complete sample
iv. Soft attack sample
v. Average attack sample
vi. Forceful attack sample
vii. Soft sustain sample
viii. Average sustain sample
ix. Forceful sustain sample 6. Also in the preferred embodiment, there can be 9 samples per note per instrument (3 complete, 3 attack, and 3 sustain)

a. In the preferred embodiment, each note can have one:

i. Soft complete sample
ii. Average complete sample
iii. Forceful complete sample
iv. Soft attack sample
v. Average attack sample
vi. Forceful attack sample
vii. Soft sustain sample
viii. Average sustain sample
ix. Forceful sustain sample Phase 1—Preparation for Analysis of the Audio 7. An audio (song) file, preferably in digital format, is fed into a computer program stored, on a computer.

8. The computer/software program preferably asks the user to select the sample rate they would like the program to use. Higher sample rates work better 9. The computer can preferably ask the user for basic information about the song, such as the key, the types of instruments present in the song, what genres apply, etc.

a. However, it should be recognized that none of this information is required for the present invention method or program to function in accordance with the goals of the invention. This additional information merely allows the present invention method and software program to work faster and more efficiently.

Phase 2—Analysis of the Audio (Using Spectral Coherence to Identify Instruments and Notes)

10. If the user has entered the information specified in Step 9, the computer adjusts its process accordingly:

a. Key i. This tells the computer to limit the samples it first compares to the inputted audio file based on the sample's note, and the probability of that note appearing in the given key. Those notes that are the most probable will be compared first.

b. Instruments present i. This tells the computer to limit the samples it compares to the inputted audio file by searching for the notes of those instruments that the user has indicated are present in the song.

ii. The user may instruct the computer to search for only those instruments he or she has indicated are present, or to first look for those instruments he or she has indicated are present and continue looking for other instruments thereafter.

c. Genre i. This tells the computer which instruments and versions of instruments are likely to be present in a song. For example, if a user chooses the genre "Hard Rock," the program will primarily search for overdriven guitars, bass guitar, piano, and drum kits.

11. The computer having the present invention software program stored or otherwise loaded therein calculates the cross-spectral density between the song and soft attack sample over the time domain of the attack sample at n=1 (the first sample of the inputted audio file), preferably using the sample as the input function and the song as the output function.

12. The computer calculates the autospectral density of the song over the time domain of the attack sample used in step 11

13. The computer uses the information stored in the databases and the results of steps 11 and 12 to calculate the coherence between the song and soft attack sample over the domain of the attack sample at n=1 (the first sample of the inputted audio file) and records the calculated value for coherence 14. The computer repeats steps 11 through 13 at the beginning of every new sample of the audio file (based on the user selected sample rate) from n=2 until $(n-x)^{th}$ sample, where x is the number of samples in the domain of the attack sample and n is the total number of samples (based on the user selected sample rate) in the audio file 15. The computer repeats steps 11 through 14 for both the medium attack samples and loud attack samples 16. The computer repeats steps 11 through 15 for each note of each instrument preferably until:

a. All samples in the database have been compared to the song b. All samples for all instruments indicated by the user have been compared to the song 17. The computer finds the peaks of the coherence values between the attack samples and the song for each note of each instrument (preferably comparing only those coherence values which were calculated using the same note and instrument), then preferably records the note, force (soft, medium, or loud attack sample), instrument, and timecode data at which each peak occurs in a third database a. The computer can preferably only record those peaks that are above a pre-specified level, to reduce errors in note identification. This level may be user selectable.

b. Thus, a new third database can be preferably created by the program for each new song the user inputs Phase 3—Preparing for Re-synthesis 18. The computer calculates, beginning at each peak, the coherence between the corresponding sustain sample (same note, force, and instrument as the peak's attack sample) and the song over the time domain of the attack sample
19. The computer then calculates the coherence between the corresponding sustain sample and the song beginning at the next sample
20. Repeat steps 18 and 19 until the coherence preferably falls below a pre-determined value
21. The computer records the duration of each note (the ending timecode of the last sample above the acceptable coherence value subtracted from the beginning timecode of the first sample) with the existing data in the third database for each note/force/instrument
22. Preferably, the computer repeats steps 18-21 for each note of each instrument until these steps have been performed for all peaks.

Phase4—Re-Synthesis

23. The program can then ask the user if they would like all instrumental parts and voice to be resynthesized, only particular instrumental parts or voice, or all instrumental parts or voice except one or two in particular. (Preferably, the computer only presents the instruments which it has detected are present in the song)
24. The computer preferably uses the note/force/instrument/duration data to resynthesize the audio using physical modeling synthesis and output an audio file
25. The computer subtracts the resynthesized audio file from the actual recording file, which results in only the vocal part
26. The computer can copy the vocal part to its own audio file, and adds the vocal part to the resynthesized audio to generate another, final audio file that contains only the instruments/voice parts the user requested.

Phase 5—Creating Sheet Music

27. The computer can ask the user if they would like sheet music generated, and if so, for which instruments or vocal part.
28. If the user answers yes or otherwise affirmatively (i.e. would like sheet music), the computer can ask the user for the time signature, beats per minute, and key of the music. Alternatively or if no response is provided by the user, the software program can default to (a) default setting for time signature, beats per minute and key of music or (b) use the time signature, beats per minute and key of music of the original stored song that was analyzed by the software program and method.
29. For each instrumental part the user requests sheet music for, the computer converts the data preferably stored in the third database (generated in steps 17 and 21) into music notation, using a similar method, such as, but not limited to, as existing MIDI-to-music notation programs do (only substituting the data from steps 17 and 21 for the MIDI data)
30. The computer prints and/or displays the sheet music
31. If the user requests sheet music for a vocal part, the computer performs a FFT (Cooley-Tukey algorithm) on only the audio of the vocal part (result of step 25)
32. The computer assigns note values to the corresponding dominant frequencies for the duration of the frequency
33. The computer uses this data to generate sheet music (preferably without words) using the same method as existing MIDI to music notation programs
34. The computer prints and/or displays the sheet music All measurements, amounts, numbers, ranges, frequencies, values, percentages, materials, orientations, sample sizes, etc. discussed above or shown in the drawing figures are merely by way of example and are not considered limiting and other measurements, amounts, values, percentages, materials, orientations, sample sizes, etc. can be chosen and used and all are considered within the scope of the invention.

While the invention has been described and disclosed in certain terms and has disclosed certain embodiments or modifications, persons skilled in the art who have acquainted themselves with the invention, will appreciate that it is not necessarily limited by such terms, nor to the specific embodiments and modification disclosed herein. Thus, a wide variety of alternatives, suggested by the teachings herein, can be practiced without departing from the spirit of the invention, and rights to such alternatives are particularly reserved and considered within the scope of the invention.

The invention claimed is:

1. A computer based method for extracting individual instrumental parts from an audio recording, said method comprising the steps of:

a. providing an audio recording;
b. selecting a sample rate;
c. calculating through a computer a cross-spectral density between the audio recording and a soft attack sample over a time domain of the soft attack sample at n=1, wherein n=1 representing a first sample of the audio recording;
d. calculating through a computer an autospectral density of the audio recording over the time domain of the soft attack sample in step (c);
e. calculating through a computer a coherence between the audio recording and the soft attack sample over the domain of the soft attack sample at n−1 using the calculations from step (c) and step (d) and information for the soft attack sample stored in an electronic database;
f. recording the calculated value for coherence;
g. repeating steps (c) through (e) at a beginning of each new sample of the audio recording from n=2 until a $(n-x)^{th}$ sample, where x is a number of samples in the domain of the soft attack sample and n is a total number of samples for the audio recording based on the sample rate selected in step (b);
h. repeating steps (c) through (g) for medium attack samples and for loud attack samples;
i. repeating steps (c) through (h) for each note for each instrument selected;
j. identifying through a computer peaks of coherence values between the attack samples and the audio recording for each note of each instrument; and
k. recording the note, force, instrument and timecode data at which each peak occurs in the electronic database or another electronic database.

2. The computer based method for extracting individual instrumental parts from an audio recording of claim 1, wherein step (i) comprises repeating until all sample in the electronic database have been compared to the audio recording and all samples for all instruments selected have been compared to the audio recording.

3. The computer based method for extracting individual instrumental parts from an audio recording of claim 1 wherein step (j) comprises the step of comparing by a computer only coherence values which were calculated using the same note and instrument.

4. The computer based method for extracting individual instrumental parts from an audio recording of claim 1 wherein step (k) comprises only recording peaks that are above a pre-specified level.

5. The computer based method for extracting individual instrumental parts from an audio recording of claim 1 further comprising the steps of:

l. beginning at each peak, calculating through a computer a coherence between a corresponding sustain sample (same note, force and instrument as the peak's attack sample) and the audio recording over the time domain of the attack sample;

m. calculating through the computer a coherence between a corresponding sustain sample and the audio recording beginning at a next sample;

n. repeating steps (l) and (m) until the coherence falls below a pre-determined value;

o. recording a duration of each note (which is an ending timecode of a last sample above an acceptable coherence value subtracted from a beginning timecode of a first sample) in the electronic database or another electronic database; and p. repeating steps (l) through (o) for each note for each instrument selected until steps (I) through (o) have been performed for all peaks.

6. The computer based method for identifying individual instrumental parts from an audio recording of claim 5 further comprising the step (q) of resynthesizing all instrumental parts and/or voice from the audio recording, only particular instrumental parts and/or voice, or all instrumental parts and/or voice except one or two in particular.

7. The computer based method for identifying individual instrumental parts from an audio recording of claim 6 wherein step (q) comprises the steps of:

q1. resynthesizing the audio recording by the computer using the note/force/instrument/duration data and physical modeling synthesis to yield a resynthesized audio file; and q2. subtracting the resynthesized audio file from the audio recording by the computer to yield a vocal part.

8. The computer based method for identifying individual instrumental parts from an audio recording of claim 7 wherein step (q) further comprises the step (q3) of copying the vocal part to its own audio file.

9. The computer based method for identifying individual instrumental parts from an audio recording of claim 7 wherein step (q) further comprises the step (q3) of adding the vocal part to the resynthesized audio file to generate a final audio file containing only the instruments and voice parts selected.

10. The computer based method for identifying individual instrumental parts from an audio recording of claim 7 further comprising the step (r) creating sheet music by the computer for one or more of the instrumental or vocal parts of the audio recording.

11. The computer based method for identifying individual instrumental parts from an audio recording of claim 10 wherein step (r) comprises the steps of r1. for each instrumental of the audio recording selected for sheet music converting data generated in steps (j), (k), (o) and (p) into music notation; and r2. printing or displaying sheet music containing the music notation from step r1.

12. The computer based method for identifying individual instrumental parts from an audio recording of claim 10 wherein step (r) comprises the steps of r1. for each vocal part of the audio recording selected for sheet music, performing a FFT (Cooley-Tukey algorithm) on the audio file for the vocal part previously derived;

r2. assigning note values by the computer to corresponding dominant frequencies for a duration of the frequency;

r3. using the data from step (r2) to generate sheet music; and r4. printing or displaying sheet music for the vocal part.

* * * * *